(12) United States Patent
Tatsumi et al.

(10) Patent No.: US 8,722,243 B2
(45) Date of Patent: May 13, 2014

(54) MATERIAL FOR USE AS ELECTROLYTE, LITHIUM SECONDARY BATTERY ELECTROLYTE, LITHIUM SECONDARY BATTERY EMPLOYING THE SAME, AND NOVEL LITHIUM SALT

(75) Inventors: Ryouta Tatsumi, Kawasaki (JP); Yasuhiro Aoki, Osaka (JP); Seiji Maeda, Osaka (JP); Mio Miyano, Yatomi (JP); Seiichirou Hayakawa, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 0 days.

(21) Appl. No.: 13/703,935

(22) PCT Filed: May 11, 2011

(86) PCT No.: PCT/JP2011/060857
§ 371 (c)(1),
(2), (4) Date: Dec. 13, 2012

(87) PCT Pub. No.: WO2011/162034
PCT Pub. Date: Dec. 29, 2011

(65) Prior Publication Data
US 2013/0089777 A1    Apr. 11, 2013

(30) Foreign Application Priority Data

Jun. 22, 2010    (JP) ................................ 2010-141424

(51) Int. Cl.
*H01M 6/04*    (2006.01)
(52) U.S. Cl.
USPC ........... 429/188; 429/314; 429/315; 429/322; 429/207

(58) Field of Classification Search
USPC .......................... 429/188, 314, 315, 322, 207
See application file for complete search history.

(56) References Cited

FOREIGN PATENT DOCUMENTS

| | | |
|---|---|---|
| JP | 2002-367675 | 12/2002 |
| JP | 2002-373704 | 12/2002 |
| JP | 2004-6240 | 1/2004 |
| JP | 2004-127774 | 4/2004 |
| JP | 2004-303642 | 10/2004 |
| JP | 2005-026091 | 12/2005 |
| JP | 2007-134282 | 5/2007 |
| JP | 2009-140641 | 6/2009 |

OTHER PUBLICATIONS

Search report from International Application No. PCT/JP2011/060857.
International Preliminary Report on Patentability and Written Opinion of the Searching Authority for International Application No. PCT/JP2011/060857.

*Primary Examiner* — Jane Rhee
(74) *Attorney, Agent, or Firm* — Greenblum & Bernstein, P.L.C.

(57) ABSTRACT

An inventive electrolyte material contains a lithium salt comprising the following components (A1) and (B), or contains the following components (A1), (A2) and (B):
(A1) a lithium cation;
(A2) an organic cation; and
(B) a cyanofluorophosphate anion represented by the following general formula (1):

$$^{-}P(CN)_nF_{6-n} \qquad (1)$$

wherein n is an integer of 1 to 5. The inventive electrolyte material is excellent in electrochemical properties, i.e., has a higher electrical conductivity and a higher oxidation potential, and is capable of forming an electrode protection film, so that a highly safe lithium secondary battery can be provided.

18 Claims, 4 Drawing Sheets

MATERIAL FOR USE AS ELECTROLYTE, LITHIUM SECONDARY BATTERY ELECTROLYTE, LITHIUM SECONDARY BATTERY EMPLOYING THE SAME, AND NOVEL LITHIUM SALT

TECHNICAL FIELD

The present invention relates to a novel electrolyte material and, more specifically, to an electrolyte material which is excellent in electrolyte material properties such as electrical conductivity and anti-oxidation potential and is capable of forming an electrode protection film and useful for a lithium secondary battery electrolyte. The invention also relates to a lithium secondary battery electrolyte, a lithium secondary battery employing the same, and a novel lithium salt.

BACKGROUND ART

In recent years, lithium secondary batteries have come into remarkably widespread use in information electronics such as notebook personal computers, mobile phones and PDAs (Personal Digital Assistants). For more convenient portable features, the batteries have been rapidly shifted toward size reduction, thickness reduction, weight reduction and higher performance. Further, an attempt is made to employ the lithium secondary batteries for electrical automobiles which are promising as the next generation automobiles. Therefore, the lithium secondary batteries are required to have a higher capacity and a higher output.

The lithium secondary battery includes an electrolyte held between a positive electrode and a negative electrode. The electrolyte is produced by dissolving a lithium salt and additives such as an electrode protection film forming agent in an organic solvent such as propylene carbonate or diethyl carbonate.

In general, $LiPF_6$ and $LiBF_4$ are used as the lithium salt. However, $^-PF_6$ and $^-BF_4$ serving as counter anions each have a lower anti-oxidation potential, so that a potential range of a positive electrode active substance is not sufficiently utilized. This prevents the automobile batteries from having a higher capacity and a higher output. For example, a higher-performance positive electrode active substance having an anti-oxidation potential of not lower than 7 V (vs $Li/Li^+$) has been development, but cannot be used as the positive electrode active substance material because the counter anion has a lower anti-oxidation potential. For the safety of the batteries in an over-charged state, an electrolyte having an anti-oxidation potential of not lower than 6 V (vs $Li/Li^+$) is demanded, and the anti-oxidation potential is desirably higher by as much as 0.1 V.

Vinylene carbonate is typically used as the electrode protection film forming agent. Vinylene carbonate can be used for formation of a protection film on a negative electrode, but does not have a positive electrode protecting function. Therefore, the potential range of the positive electrode active substance is not sufficiently utilized. Further, it is imperative to ensure the safety of the electrical automobile batteries. In order to eliminate the danger of ignition and explosion due to short circuit, there is a demand for an electrode protective film forming material effective for the positive electrode.

For the prevention of the ignition and the explosion, an attempt is made to replace a part or all of an organic solvent serving as an electrolytic liquid with a flame-retardant and less volatile ionic liquid. However, the ionic liquid has a higher viscosity than the organic solvent. Therefore, an electrolyte prepared by dissolving the lithium salt in the ionic liquid has a problem of a poor electrical conductivity. The term "ionic liquid" herein means a compound which is a salt containing a cation and an anion and having a melting point not higher than about a room temperature.

For the higher performance and the safety of the batteries described above, various lithium salts, electrode protection film forming materials and ionic liquids are proposed. An ion conductive material including a lithium cation and an anion having a specific structure, for example, is proposed as a lithium salt (see, for example, PLT1). Compounds such as 1,3-propanesultone are proposed as electrode protection film forming materials (see, for example, PLT2 to PLT6). Further, an electrolyte containing a specific organic cation, a lithium cation and a nitrogen-containing organic anion is proposed as an ionic liquid (see, for example, PLT7).

CITATION LIST

Patent Literature

PLT1: JP-A-2004-6240
PLT2: JP-A-2002-367675
PLT3: JP-A-2002-373704
PLT4: JP-A-2005-026091
PLT5: JP-A-2007-134282
PLT6: JP-A-2009-140641
PLT7: JP-A-2004-303642

SUMMARY OF INVENTION

In the art disclosed in PLT1, however, the anti-oxidation potential is stable up to 4.5 V (vs $Li/Li^+$), but does not satisfy a potential level of not lower than 5 V required for the automobile battery. This is because a decomposition reaction proceeds on a surface of the positive electrode of the battery due to oxidation with the anion.

In the art disclosed in PLT2 to PLT6, an SEI (Solid Electrolyte Interface) is formed on the negative electrode to increase the use potential on a reduction side, but it is impossible to form a protection film effective for the positive electrode.

In the art disclosed in PLT7, $^-N(SO_2CF_3)_2$, $^-N(SO_2C_2F_5)_2$, $^-N(SO_2CF_3)(SO_2C_4F_9)$ or the like is used as the anion of the electrolyte. However, the electrolyte employing such an anion has a problem of a poor electrical conductivity. Particularly, it is impossible to ensure an electrical conductivity required for the automobile battery electrolyte at a cryogenic temperature (e.g., at $-20°$ C.)

Further, a decomposition reaction proceeds on the positive electrode surface of the battery due to oxidation with the anion. Therefore, even if a positive electrode material and a negative electrode material having wider potential windows are used, the wider potential windows cannot be effectively utilized.

In view of the foregoing, it is an object of the present invention to provide an electrolyte material which is excellent in electrochemical properties such as electrical conductivity and anti-oxidation potential, capable of forming an electrode protection film, and useful for a highly safe lithium secondary battery electrolyte, to provide a lithium secondary battery electrolyte and a lithium secondary battery employing the same, and to provide a novel lithium salt useful for the electrolyte material.

In view of the foregoing, the inventors of the present invention conducted intensive studies and, as a result, found that an electrolyte material containing a lithium salt comprising a lithium cation and a phosphate anion having a cyano group and a fluorine atom, and an electrolyte material containing a lithium cation, an organic cation and a phosphate anion having a cyano group and a fluorine atom are excellent in electrochemical properties and electrode protection film forming capability. Thus, the inventors attained the present invention.

According to an inventive aspect, there is provided an electrolyte material comprising a lithium salt which comprises the following components (A1) and (B):
(A1) a lithium cation; and
(B) a cyanofluorophosphate anion represented by the following general formula (1):

wherein n is an integer of 1 to 5.

The present invention further provides an electrolyte material comprising the following components (A1), (A2) and (B):
(A1) a lithium cation;
(A2) an organic cation; and
(B) a cyanofluorophosphate anion represented by the above general formula (1).

The present invention further provides a lithium secondary battery electrolyte comprising the electrolyte material described above, and a lithium secondary battery including the electrolyte held between a positive electrode and a negative electrode.

The present invention further provides a novel lithium salt useful for the electrolyte material.

The inventive electrolyte materials are excellent in electrochemical properties, i.e., have a higher electrical conductivity and a higher anti-oxidation potential, and are capable of forming an electrode protection film, thereby making it possible to provide a highly safe lithium secondary battery.

DESCRIPTION OF EMBODIMENTS

The present invention will hereinafter be described in detail.

In the present invention, the term "electrolyte material" means a material that includes a lithium salt, an electrode protection film forming agent, an electrolytic liquid and various additives constituting an electrolyte of a battery and has functions of these ingredients.

An inventive electrolyte material containing a lithium salt including a lithium cation (A1) and a cyanofluorophosphate anion (B) functions as the lithium salt in the presence of the lithium cation, and functions as a positive electrode protection film forming agent in the presence of the cyanofluorophosphate anion. Further, the inventive electrolyte material is excellent in electrical conductivity and anti-oxidation potential in the absence of the counter anion (e.g., $^-PF_6$, $^-BF_4$ and the like) of the conventionally blended lithium salt in the system.

An inventive electrolyte material containing a lithium cation (A1), an organic cation (A2) and a cyanofluorophosphate anion (B) functions as a lithium salt in the presence of the lithium cation, and functions as a positive electrode protection film forming agent in the presence of the cyanofluorophosphate anion. Further, the inventive electrolyte material functions as an easy-to-handle and highly safe electrolytic liquid in the presence of the organic cation, which forms an ionic liquid together with the cyanofluorophosphate anion.

The inventive electrolyte material is an electrolyte material which contains a lithium salt including a lithium cation (A1) and a cyanofluorophosphate anion (B) represented by the following general formula (1):

wherein n is an integer of 1 to 5.

In the above general formula (1), n is preferably 2 to 4 for the electrode protective film forming capability, and particularly preferably 3 for the electrical conductivity of the electrolyte.

The concentration of the lithium salt in the inventive electrolyte material is preferably 0.1 to 5 mol/kg, more preferably 0.3 to 3 mol/kg, further more preferably 0.5 to 2 mol/kg. If the concentration of the lithium salt is excessively low, the amount of lithium in the electrolyte tends to be insufficient. If the concentration of the lithium salt is excessively high, the viscosity of the electrolyte tends to be increased, thereby reducing the electrical conductivity.

A notable effect of the inventive electrolyte material is that, when the battery is charged and discharged, a very small amount of a decomposition product of the anion forms an electrochemically stable SEI (Solid Electrolyte Interface) on a positive electrode material surface to protect the electrode and suppress further decomposition of the electrolyte. This effect makes it possible to use an intrinsically wider potential range of the positive electrode active substance and stabilizes the anti-oxidation potential of the battery.

Although the mechanism of how the inventive anion forms the SEI is not clarified, the formation of the stable SEI is supposedly because a cyano group, fluorine and/or phosphorus of the anion react with the electrode surface. In general, the electrode protection film forming agent such as vinylene carbonate is capable of forming a protection film on the negative electrode to stabilize a reduction potential. In contrast, the inventive electrolyte material is capable of forming a protective film on the positive electrode to stabilize the anti-oxidation potential. Of course, a battery stably operative at a wide range of potential can be produced by employing these materials.

In general, when a lithium salt is dissolved in an electrolytic liquid, the resulting electrolyte has a higher viscosity than the electrolytic liquid. As a result, if the lithium salt is dissolved in an amount greater than necessary in the electrolytic liquid, the mobility of the lithium cation is reduced to reduce the electrical conductivity of the electrolyte and the charging/discharging speed. This phenomenon is disadvantageous for a high capacity battery requiring a greater amount of the lithium cation and for an electrical automobile battery requiring a high speed charging and discharging operation.

The inventive electrolyte material contains the lithium cation (A1) but, when being dissolved in the electrolytic liquid, has a higher electrical conductivity without increase in the viscosity of the electrolyte and permits the high speed charging and discharging operation of the battery. This effect is remarkable when n is 2 to 4 in the general formula (1). In this case, presence of a geometrical isomer of the anion supposedly prevents the increase in the viscosity. Particularly when n is 3 in the general formula (1), the anion has geometrical isomers (Facial and Meridional isomers) each having an asymmetrical chemical structure, which supposedly prevents the increase in the viscosity of the electrolyte.

The present invention also provides an electrolyte material containing a lithium cation (A1), an organic cation (A2) and a cyanofluorophosphate anion (B). In this case, the organic cation (A2) is contained and, therefore, forms an ionic liquid together with the cyanofluorophosphate anion (B). The ionic liquid is flame-retardant to improve the safety of the electrolyte.

The electrolyte material can be provided as an easy-to-handle liquid electrolyte material by controlling the proportion of the organic cation (A2). As described above, the lithium secondary battery electrolyte is produced by dissolving the lithium salt and the electrode protection film forming agent in the electrolytic liquid. This production process is performed in a possibly moisture-free dry atmosphere in a clean environment. This requires a huge facility and great efforts. In general, the lithium salt is solid, so that removal of moisture is difficult. On the contrary, the inventive electrolyte material containing the lithium cation (A1), the organic cation (A2) and the cyanofluorophosphate anion (B) is provided in a liquid form, thereby facilitating the removal of the moisture and the dissolution in the electrolytic liquid. This simplifies the electrolyte production process.

In the present invention, the mole number $a_1$ of the lithium cation (A1) and the mole number $a_2$ of the organic cation (A2) preferably satisfy the following expression:

$$0.1 \leq a_1/(a_1+a_2) \leq 0.9 \tag{1-1}$$

If $a_1/(a_1+a_2)$ is less than the lower limit of the aforementioned range, the amount of the lithium cation tends to be insufficient. If $a_1/(a_1+a_2)$ is greater than the upper limit of the aforementioned range, liquefaction of the electrolyte tends to be difficult.

For a lower viscosity, $a_1/(a_1+a_2)$ satisfying the expression (1-1) more preferably satisfies the following expression:

$$0.2 \leq a_1/(a_1+a_2) \leq 0.8 \tag{1-2}$$

In terms of a boiling point, the following expression is further more preferably satisfied:

$$0.3 \leq a_1/(a_1+a_2) \leq 0.7 \tag{1-3}$$

For the safety of the electrolyte, the following expression is particularly preferably satisfied:

$$0.4 \leq a_1/(a_1+a_2) \leq 0.6 \tag{1-4}$$

Examples of the organic cation (A2) of the inventive electrolyte material include nitrogen-containing organic cations such as imidazolium cations, pyrrolidinium cations, piperidinium cations and aliphatic quaternary ammonium cations, phosphorus-containing organic cations such as tetramethylphosphonium cation, tetraethylphosphonium cation, tetrapropylphosphonium cation, tetrabutylphosphonium cation, tetraoctylphosphonium cation, trimethylethylphosphonium cation, triethylmethylphosphonium cation, hexyltrimethylphosphonium cation, trimethyloctylphosphonium and triethyl(methoxymethyl)phosphonium, sulfur-containing organic cations such as trimethylsulfonium cation, triethylsulfonium cation, tributylsulfonium cation, diethylmethylsulfonium cation, dimethylpropylsulfonium and dimethylhexylsulfonium, and oxonium cations, among which the nitrogen-containing organic cations are preferred in terms of electrochemical stability.

Examples of the nitrogen-containing cations include imidazolium cations, pyrrolidinium cations, piperidinium cations and aliphatic quaternary ammonium cations.

Examples of the imidazolium cations include: disubstituted imidazolium cations such as
1,3-dimethylimidazolium, 1-ethyl-3-methylimidazolium,
1-methyl-3-propylimidazolium,
1-butyl-3-methylimidazolium,
1-methyl-3-pentylimidazolium,
1-hexyl-3-methylimidazolium,
1-heptyl-3-methylimidazolium,
1-methyl-3-octylimidazolium,
1-decyl-3-methylimidazolium,
1-dodecyl-3-methylimidazolium,
1-ethyl-3-propylimidazolium,
1-butyl-3-ethylimidazolium,
1-methoxyethyl-3-methylimidazolium,
1-cyanomethyl-3-methylimidazolium,
1-cyanoethyl-3-methylimidazolium,
1-(3-cyanopropyl)-3-methylimidazolium,
1-methyl-3-trifluoromethylimidazolium,
1-methyl-3-perfluoroethylimidazolium,
1-methyl-3-perfluoropropylimidazolium,
1-methyl-3-perfluorobutylimidazolium,
1-ethyl-3-trifluoromethylimidazolium,
1-ethyl-3-perfluoroethylimidazolium,
1-ethyl-3-perfluoropropylimidazolium,
1-ethyl-3-perfluorobutylimidazolium,
1-propyl-3-trifluoromethylimidazolium,
1-perfluoroethyl-3-propylimidazolium,
1-perfluoropropyl-3-propylimidazolium,
1-perfluorobutyl-3-propylimidazolium,
1-butyl-3-trifluoromethylimidazolium,
1-butyl-3-perfluoroethylimidazolium,
1-butyl-3-perfluoropropylimidazolium,
1-butyl-3-perfluorobutylimidazolium,
1,3-bis(trifluoromethyl)imidazolium,
1-perfluoroethyl-3-trifluoromethylimidazolium,
1-perfluoropropyl-3-trifluoromethylimidazolium,
1-perfluorobutyl-3-trifluoromethylimidazolium,
1,3-bis(perfluoroethyl)imidazolium,
1-perfluoroethyl-3-perfluoropropylimidazolium,
1-perfluorobutyl-3-perfluoroethylimidazolium,
1,3-bis(perfluoropropyl)imidazolium,
1-perfluorobutyl-3-perfluoropropylimidazolium and
1,3-bis(perfluorobutyl)imidazolium; and
trisubstituted imidazolium cations such as
1,2,3-trimethylimidazolium,
1,3,5-trimethylimidazolium,
2-ethyl-1,3-dimethylimidazolium,
3-ethyl-1,2-dimethylimidazolium,
3-ethyl-1,5-dimethylimidazolium,
1,2-dimethyl-3-propylimidazolium,
1,3-dimethyl-2-propylimidazolium,
1,5-dimethyl-3-propylimidazolium,
1-butyl-2,3-dimethylimidazolium,
2-butyl-1,3-dimethylimidazolium,
3-butyl-1,5-dimethylimidazolium,
1,2-dimethyl-3-hexylimidazolium,
1,2-dimethyl-3-octylimidazolium,
1-ethyl-3,4-dimethylimidazolium,
1-isopropyl-2,3-dimethylimidazolium,
3-trifluoromethyl-1,2-dimethylimidazolium,
3-perfluoroethyl-1,2-dimethylimidazolium,
3-perfluoropropyl-1,2-dimethylimidazolium,
3-perfluorobutyl-1,2-dimethylimidazolium,
1,3-bis(trifluoromethyl)-2-methylimidazolium,
1-perfluoroethyl-2-methyl-3-trifluoromethylimidazolium,
2-cyano-1,3-dimethylimidazolium,
2-cyano-1-ethyl-4-methylimidazolium,
2-cyano-1-propyl-4-methylimidazolium and
1-butyl-2-cyano-4-methylimidazolium.

Examples of the pyrrolidinium cations include
N,N-dimethylpyrrolidinium,
N-ethyl-N-methylpyrrolidinium,
N-methyl-N-propylpyrrolidinium, N-butyl-N-methylpyrrolidinium,
N-methyl-N-pentylpyrrolidinium,
N-hexyl-N-methylpyrrolidinium,
N-methyl-N-octylpyrrolidinium,
N-decyl-N-methylpyrrolidinium,
N-dodecyl-N-methylpyrrolidinium,
N-(2-methoxyethyl)-N-methylpyrrolidinium,
N-(2-ethoxyethyl)-N-methylpyrrolidinium,
N-(2-propoxyethyl)-N-methylpyrrolidinium and
N-(2-isopropoxyethyl)-N-methylpyrrolidinium.

Examples of the piperidinium cations include
N,N-dimethylpiperidinium,
N-ethyl-N-methylpiperidinium ion,
N-methyl-N-propylpiperidinium,
N-butyl-N-methylpiperidinium,
N-methyl-N-pentylpiperidinium,
N-hexyl-N-methylpiperidinium,
N-methyl-N-octylpiperidinium,
N-decyl-N-methylpiperidinium,
N-dodecyl-N-methylpiperidinium,
N-(2-methoxyethyl)-N-methylpiperidinium,
N-(2-methoxyethyl)-N-ethylpiperidinium,
N-(2-ethoxyethyl)-N-methylpiperidinium,
N-methyl-N-(2-methoxyphenyl)piperidinium,
N-methyl-N-(4-methoxyphenyl)piperidinium,
N-ethyl-N-(2-methoxyphenyl)piperidinium and
N-ethyl-N-(4-methoxyphenyl)piperidinium.

Examples of the aliphatic quaternary ammonium cations
include N,N,N,N-tetramethylammonium,
N,N,N-trimethylethylammonium,
N,N,N-trimethylpropylammonium,
N, N, N-trimethylbutylammonium,
N,N,N-trimethylpentylammonium,
N, N, N-trimethylhexylammonium,
N,N,N-trimethylheptylammonium,
N,N,N-trimethyloctylammonium,
N,N,N-trimethyldecylammonium,
N,N,N-trimethyldodecylammonium,
N-ethyl-N,N-dimethylpropylammonium,
N-ethyl-N,N-dimethylbutylammonium,
N-ethyl-N,N-dimethylhexylammonium,
2-methoxy-N,N,N-trimethylethylammonium,
2-ethoxy-N,N,N-trimethylethylammonium,
2-propoxy-N,N,N-trimethylethylammonium,
N-(2-methoxyethyl)-N,N-dimethylpropylammonium and
N-(2-methoxyethyl)-N,N-dimethylbutylammonium.

Among the nitrogen-containing organic cations described above, the imidazolium cations are particularly preferred for ionic conductivity. Further, dialkylimidazolium cations such as
1-ethyl-3-methylimidazolium,
1-propyl-3-methylimidazolium and
1-butyl-3-methylimidazolium, and trialkylimidazolium cations such as 1-butyl-2,3-dimethylimidazolium are preferred in terms of anti-oxidation potential.

Thus, the inventive electrolyte material is provided, which is blended with an electrolytic liquid to provide an electrolyte containing the lithium cation and capable of forming an electrode protection film.

In the present invention, known organic solvents and ionic liquids are usable for the electrolytic liquid. Liquid compounds such as phosphates, polymers such as polyethylene glycol and polypropylene glycol, and solids such as inorganic materials are also usable.

Examples of the organic solvents include carbonate solvents (propylene carbonate, ethylene carbonate, butylene carbonate, dimethyl carbonate, diethyl carbonate and the like), amide solvents (N-methylformamide, N-ethylformamide, N,N-dimethylformamide, N-methylacetamide, N-ethylacetamide, N-methylpyrrolidinone and the like), lactone solvents (γ-butyrolactone, γ-valerolactone, δ-valerolactone, 3-methyl-1,3-oxazolidin-2-one and the like), alcohol solvents (ethylene glycol, propylene glycol, glycerin, methyl cellosolve, 1,2-butanediol, 1,3-butanediol, 1,4-butanediol, diglycerin, polyoxyalkylene glycol cyclohexanediols, xylene glycols and the like), ether solvents (methylal, 1,2-dimethoxyethane, 1,2-diethoxyethane, 1-ethoxy-2-methoxyethane, alkoxypolyalkylene ethers and the like), nitrile solvents (benzonitrile, acetonitrile, 3-methoxypropionitrile and the like), phosphoric acid solvents and phosphate solvents (orthophosphoric acid, metaphosphoric acid, pyrophosphoric acid, polyphosphoric acid, phosphorous acid, trimethyl phosphate and the like), 2-imidazolidinones (1,3-dimethyl-2-imidazolidinone and the like), pyrrolidones, sulfolane solvents (sulfolane, tetramethylene sulfolane and the like), furan solvents (tetrahydrofuran, 2-methyltetrahydrofuran, 2,5-dimethoxytetrahydrofuran and the like), dioxolanes and dioxanes, which may be used either alone or in combination in the form of solvent mixture. Among these solvents, the carbonate solvents, the ether solvents, the furan solvents and the sulfolane solvents are preferred for the electrical conductivity of the resulting electrolyte. In particular, the sulfolane solvents are more preferably used for the safety of the battery.

Examples of the ionic liquids include those containing a chloride anion, a bromide anion, an iodide anion, $BF_4^-$, $BF_3CF_3^-$, $BF_3C_2F_5^-$, $PF_6^-$, $NO_3^-$, $CF_3CO_2^-$, $CF_3SO_3^-$, $(CF_3SO_2)_2N^-$, $(FSO_2)_2N^-$, $(CF_3SO_2)(FSO_2)N^-$, $(CN)_2N^-$, $(CN)_3C^-$, $(CF_3SO_2)_3C^-$, $(C_2F_5SO_2)_2N^-$, $AlCl_4$ and $Al_2Cl_7$ as an anion. Exemplary counter cations for these anions include alkylimidazolium cations such as
1,3-dimethylimidazolium, 1-ethyl-3-methylimidazolium,
1-butyl-3-methylimidazolium,
1-hexyl-3-methylimidazolium,
1-octyl-3-methylimidazolium,
1-butyl-2,3-dimethylimidazolium,
1,2,3-trimethylimidazolium and
1,2-dimethyl-3-ethylimidazolium. Other examples of the ionic liquids include those containing a quaternary ammonium cation, a pyridinium cation and a quaternary phosphonium cation. These ionic liquids may be used either alone or in combination. Among these ionic liquids, the ionic liquids containing the imidazolium cations are preferred for the electrical conductivity of the resulting electrolyte.

The proportion of the inventive electrolyte material is preferably 3 to 90 wt %, more preferably 6 to 80 wt %, further more preferably 7 to 75 wt %, particularly preferably 8 to 70 wt %, based on 100 wt % of the overall electrolyte. If the proportion of the electrolyte material is excessively low, the amount of the lithium cation in the electrolyte is insufficient and, therefore, the electrical conductivity is liable to be reduced. If the proportion of the electrolyte material is excessively high, the high-speed charging and discharging operation tends to be difficult due to higher viscosity.

Thus, the inventive electrolyte is provided by using the inventive electrolyte material. The electrolyte preferably has an anti-oxidation potential of not lower than 6 V (vs $Li/Li^+$). The range of the anti-oxidation potential is more preferably not lower than 6.5 V, further more preferably not lower than 6.8 V, particularly preferably not lower than 7 V. If the anti-oxidation potential is excessively low, it will be difficult to employ the electrolyte for automobile batteries required to have a higher capacity and a higher output.

The anti-oxidation potential is measured by a method to be described later, in which peaks detected due to slight decomposition of the electrolyte material are ignored. Minute electric current peaks, which are generally observed when an electrode protection film is formed during the measurement, do not impair the features of the present invention. These peaks disappear after repeated measurement during which the electrode protection film is sufficiently formed. More specifically, peaks having a current density of less than 1 mA/cm$^2$ are ignored.

The inventive electrolyte preferably has an electrical conductivity of not lower than 5 mS/cm, more preferably not lower than 7 mS/cm, further more preferably not lower than 9 mS/cm, particularly preferably not lower than 10 mS/cm as measured at 25° C. The upper limit of the electrical conductivity at 25° C. is typically 100 mS/cm. If the electrical conductivity at 25° C. is excessively low, the high-speed charging and discharging operation of the battery tends to be difficult.

In this embodiment, the electrical conductivity at a cryogenic temperature is important. For example, the inventive electrolyte preferably has an electrical conductivity of not lower than 0.01 mS/cm, more preferably not lower than 0.1 mS/cm, further more preferably not lower than 1 mS/cm, particularly preferably not lower than 2 mS/cm, as measured at −20° C. The upper limit of the electrical conductivity at −20° C. is typically 10 mS/cm. If the electrical conductivity at −20° C. is excessively low, the operation of the battery in cold districts tends to be difficult.

The electrical conductivities at 25° C. and at −20° C. are measured by a method to be described later.

Next, production methods for the inventive electrolyte materials will be described.

The inventive electrolyte material contains the novel lithium salt including the lithium cation (A1) and the cyanofluorophosphate anion (B).

First, a preparation method for the novel lithium salt including the lithium cation (A1) and the cyanofluorophosphate anion (B) will be described.

The lithium salt is represented by a chemical formula $^+$Li·$^-$P(CN)$_n$F$_{6-n}$ (wherein n is an integer of 1 to 5).

The preparation method for a lithium salt of the above chemical formula wherein n=3 will be described by way of specific example but not by way of limitation.

A cyano compound is added to phosphorus trichloride in a proportion of 1 to 10 equivalents, preferably 3 to 8 equivalents, per mole of phosphorus trichloride, and a reaction is allowed to proceed with stirring typically at −30° C. to 120° C. for several minutes to several tens hours, preferably at 20° C. to 120° C. for 10 minutes to 50 hours, particularly preferably at 30° C. to 110° C. for 1 to 24 hours, to provide tricyanophosphine. The reaction is preferably allowed to proceed in an inert gas atmosphere, particularly preferably in a dry atmosphere. Preferred examples of a reaction solvent include solvents such as acetone, methyl ethyl ketone, acetonitrile, dichloromethane, dichloroethylene, chloroform, tetrahydrofuran (THF), dimethylformamide (DMF), dimethyl sulfoxide (DMSO), carbon tetrachloride, benzene, toluene and xylene, and electrolytic liquids such as propylene carbonate (PC), ethylene carbonate (EC), dimethyl carbonate (DMC), diethyl carbonate (DEC) and ethyl methyl carbonate (EMC). Particularly, toluene and xylene are preferred for reactivity. Examples of the cyano compound include hydrogen cyanide, trimethylsilyl cyanide, potassium cyanide, sodium cyanide, silver cyanide and copper cyanide, among which silver cyanide and copper cyanide are preferred.

In turn, 1 to 2 equivalents of a halogen is added to the resulting tricyanophosphine, and a reaction is allowed to proceed in a reaction solvent with stirring typically at −196° C. to 50° C. for several minutes to several hours, preferably at −78° C. to 40° C. for 10 minutes to 2 hours, to provide a dihalotricyanophosphine. The reaction is preferably allowed to proceed in an inert gas atmosphere, particularly preferably in a dry atmosphere. Preferred examples of the reaction solvent include polar solvents such as acetone, methyl ethyl ketone, acetonitrile, dichloromethane, dichloroethylene, chloroform, tetrahydrofuran (THF), dimethylformamide (DMF) and dimethyl sulfoxide (DMSO), and electrolytic liquids such as propylene carbonate (PC), ethylene carbonate (EC), dimethyl carbonate (DMC), diethyl carbonate (DEC) and ethyl methyl carbonate (EMC). Particularly, dichloromethane and acetonitrile are preferred. Examples of the halogen to be used include fluorine, chlorine, bromine and iodine. For reactivity, chlorine is preferred. A halogenating agent such as sulfuryl chloride may be used instead of the halogen. In this case, sulfur dioxide generated as a side product is removed by replacement with argon. Thus, the dihalotricyanophosphine is provided.

Further, the dihalotricyanophosphine is lithiated with a lithiating agent such as a lithium halide to provide a lithium trihalotricyanophosphate. More specifically, the lithium halide is added to the dihalotricyanophosphine in a proportion of 1 to 10 equivalents per equivalent of the dihalotricyanophosphine, and a reaction is allowed to proceed typically at −196° C. to 100° C. for several minutes to several tens hours, preferably at −78° C. to 80° C. for 1 to 24 hours, particularly preferably at −78° C. to 60° C. for 2 to 8 hours, to provide the lithium trihalotricyanophosphate.

Examples of the lithium halide include LiF, LiCl, LiBr and LiI, among which LiCl is preferred for reactivity. In this case, lithium trichlorotricyanophosphate is provided.

The lithium trihalotricyanophosphate is fluorinated with a fluorinating agent to provide a trifluorotricyanophosphate salt. More specifically, the fluorinating agent is added to the lithium trihalotricyanophosphate in a proportion of 3 to 10 equivalents per equivalent of the lithium trihalotricyanophosphate, and a reaction is allowed to proceed typically at 0° C. to 100° C. for several minutes to several tens hours, preferably at 20° C. to 80° C. for 1 to 24 hours, particularly preferably at 25° C. to 60° C. for 2 to 8 hours, to provide the trifluorotricyanophosphate salt. Preferred examples of the reaction solvent include acetone, methyl ethyl ketone, acetonitrile, dichloromethane, dichloroethylene, chloroform, tetrahydrofuran (THF), dimethylformamide (DMF), dimethyl sulfoxide (DMSO), propylene carbonate (PC), ethylene carbonate (EC), dimethyl carbonate (DMC), diethyl carbonate (DEC) and ethyl methyl carbonate (EMC). Particularly, dichloromethane, acetonitrile and dimethyl carbonate (DMC) are preferred for solubility. Examples of the fluorinating agent include LiF, NaF, KF, AgF, LiBF$_4$, NaBF$_4$, KBF$_4$ and AgBF$_4$, among which AgBF$_4$ is preferred for reactivity.

Where AgBF$_4$ is used as the fluorinating agent, silver trifluorotricyanophosphate is generated. Therefore, the lithiating agent is used again for cation exchange between silver ions and lithium ions to provide lithium trifluorotricyanophosphate at high purity. More specifically, the lithiating agent is added to silver trifluorotricyanophosphate in a proportion of 1 to 10 equivalents per equivalent of silver trifluorotricyanophosphate, and a reaction is allowed to proceed typically at 0° C. to 100° C. for several minutes to several tens hours, preferably at 20° C. to 80° C. for 0.5 to 24 hours, particularly preferably at 25° C. to 60° C. for 0.5 to 8 hours, to provide the intended lithium trifluorotricyanophosphate. Preferred examples of a reaction solvent include acetone, methyl ethyl ketone, acetonitrile, dichloromethane, dichloroethylene, chloroform, tetrahydrofuran (THF), dimethylformamide (DMF), dimethyl sulfoxide (DMSO), propylene carbonate (PC), ethylene carbonate (EC), dimethyl carbonate (DMC), diethyl carbonate (DEC) and ethyl methyl carbonate (EMC). Particularly, dimethyl carbonate (DMC) is preferred for solubility. Examples of the lithiating agent include LiBr, LiCl and LiI, among which LiI is preferred for the removal ratio of silver ions.

Lithium trifluorotricyanophosphate thus provided is preferably refined for removal of impurities. Exemplary processes for the refining include filtration, extraction, washing, column chromatography, re-precipitation and adsorption, among which extraction with acetonitrile or dimethyl carbonate is preferred for improvement of the electrochemical properties. Further, the resulting lithium trifluorotricyanophosphate is preferably dried in vacuum, and preferably stored in a dry atmosphere for the improvement of the electrochemical properties.

Thus, the inventive lithium salt is provided, which is very useful for the electrolyte material.

The present invention also provides the electrolyte material containing the lithium cation (A1), the organic cation (A2) and the cyanofluorophosphate anion (B). A production method for the electrolyte material will hereinafter be described.

The electrolyte material is produced, for example, by cation exchange of anionic liquid (I) including the organic cation (A2) and the cyanofluorophosphate anion (B). That is, the organic cation (A2) in the ionic liquid (I) is partly exchanged with the lithium cation (A1).

First, a production method for the ionic liquid (I) including the organic cation (A2) and the cyanofluorophosphate anion (B) will be described.

An alkylimidazolium cation is used as the organic cation (A2) by way of example. A chloride of the cation is allowed to react with phosphorus pentachloride, and the resulting hexachlorophosphate anion is cyanated and then fluorinated to provide a cyanofluorophosphate anion. However, the present invention is not limited to this, and the ionic liquid (I) can be produced in the following manner even with the use of different materials.

The chloride of the alkylimidazolium serving as a cation source is prepared by allowing equivalent molar amounts of imidazole and a chloroalkyl to react with each other to provide a quaternary ammonium salt.

In turn, equivalent molar amounts of the chloride of the alkylimidazolium and phosphorus pentachloride are stirred in a reaction solvent, and a reaction is allowed to proceed typically at a room temperature to 100° C. for several minutes to several hours, preferably at a room temperature to 50° C. for 10 minutes to 1 hour, to provide an intermediate product containing the alkylimidazolium cation and the hexachlorophosphate anion. The reaction is preferably allowed to proceed in an inert gas atmosphere, particularly preferably in a dry atmosphere. Preferred examples of the reaction solvent include polar solvents such as acetone, methyl ethyl ketone, acetonitrile, dichloromethane, dichloroethylene, chloroform, tetrahydrofuran (THF), dimethylformamide (DMF) and dimethyl sulfoxide (DMSO). Particularly, dehydrated dichloromethane and dehydrated acetonitrile are preferred.

Further, a cyano compound is added into the reaction system, for example, in a proportion of 1 to 10 equivalents per mole of the intermediate product containing the alkylimidazolium cation and the hexachlorophosphate anion with stirring, and a reaction is allowed to proceed typically at −30° C. to 100° C. for several minutes to several tens hours, preferably at 0° C. to 50° C. for 10 minutes to 50 hours, particularly preferably 10° C. to 30° C. for 1 to 24 hours, to provide an intended ionic liquid containing a cyanochlorophosphate anion. The reaction is preferably allowed to proceed in an inert gas atmosphere, particularly preferably in a dry atmosphere. Examples of the cyano compound include hydrogen cyanide, trimethylsilyl cyanide, potassium cyanide, sodium cyanide, silver cyanide and copper cyanide, among which silver cyanide and copper cyanide are preferred.

The resulting ionic liquid including the alkylimidazolium cation and the cyanochlorophosphate anion is preferably refined for removal of generated metal halides and impurities. Exemplary processes for the refining include filtration, extraction, washing, column chromatography, re-precipitation and adsorption, among which the column chromatography is preferred for improvement of the electrochemical properties of the ionic liquid. Exemplary column fillers include alumina, silica gel, diatomaceous earth and active carbon. Particularly, alumina is preferred for efficient removal of impurity ions.

Thus, the ionic liquid having the alkylimidazolium cation and the cyanochlorophosphate anion is provided by using the halide of the alkylimidazolium and phosphorus pentachloride as ingredients. In a general formula $^-P(CN)_nX_{6-n}$ (X=Cl) for the cyanochlorophosphate anion, n may be controlled by the proportion of the cyano compound to be blended, the reaction period, the refining conditions and the like.

Subsequently, the ionic liquid having the cyanochlorophosphate anion is fluorinated with a fluorinating agent to provide an ionic liquid having the cyanofluorophosphate anion. More specifically, the fluorinating agent is added to the ionic liquid having the cyanochlorophosphate anion in a proportion of 1 to 10 equivalents per equivalent of the ionic liquid, and a reaction is allowed to proceed typically at 0° C. to 100° C. for several minutes to several tens hours, preferably at 20° C. to 80° C. for 1 to 24 hours, particularly preferably at 25° C. to 60° C. for 3 to 8 hours, to provide the intended ionic liquid having the cyanofluorophosphate anion. Examples of the fluorinating agent include HF, LiF, NaF, KF, AgF, $LiBF_4$, $NaBF_4$, $KBF_4$ and $AgBF_4$, among which $AgBF_4$ and AgF are preferred.

Where a metal salt is used as the fluorinating agent, a posttreatment is preferably performed for removal of a metal cation generated as a side product by adding a metal cation scavenger to the resulting ionic liquid. A compound containing a cation of the intended ionic liquid and a halogen anion is preferred as the metal cation scavenger. Where an ionic liquid having a 1-ethyl-3-methylimidazolium cation and the cyanofluorophosphate anion is to be produced, for example, a halide of the 1-ethyl-3-methylimidazolium cation is used. A chloride is preferred as the halide. The proportion of the metal cation scavenger is preferably 0.1 to 1 equivalent, particularly preferably 0.3 to 0.8 equivalents, per equivalent of the used fluorinating agent. For the posttreatment, the metal cation scavenger is added to the ionic liquid, and a reaction is allowed to proceed typically at 0° C. to 50° C. for several minutes to several hours, preferably at 10° C. to 40° C. for 10 minutes to 1 hour. Thereafter, a precipitated metal halide is filtered away, and the filtrate is rinsed with water and dehydrated. Thus, a highly pure ionic liquid is provided.

The resulting ionic liquid including the alkylimidazolium cation and the cyanofluorophosphate anion is preferably further refined for removal of impurities. Exemplary processes for the refining include filtration, extraction, washing, column chromatography, re-precipitation and adsorption, among which the column chromatography is preferred for improvement of the electrochemical properties of the ionic liquid. Exemplary column fillers include alumina, silica gel, diatomaceous earth and active carbon. Particularly, alumina is preferred for efficient removal of impurity ions.

The inventive electrolyte material is produced by using the resulting ionic liquid (I) including the organic cation (A2) and the cyanofluorophosphate anion (B). The inventive electrolyte material is produced by partly exchanging the organic cation (A2) with the lithium cation (A1) by a known cation exchange method using an ion exchange resin. From the viewpoint of the productivity, the inventive electrolyte material is more preferably produced, for example, by causing the ionic liquid (I) to react with a lithium salt (II) including the lithium cation (A1) and a counter anion, and removing the counter anion attributable to the lithium salt by rinsing with a solvent or decomposition.

The cation exchange method using the ion exchange resin may be a known method. For example, an ion exchange resin such as of styrene is treated with an aqueous solution of lithium hydroxide to be caused to carry the lithium cation, and then treated with the ionic liquid (I), whereby the organic cation (A2) is partly exchanged with the lithium cation (A1).

The inventive electrolyte material is more preferably produced by causing the ionic liquid (I) to react with the lithium salt (II) including the lithium cation (A1) and a counter anion, and removing the counter anion attributable to the lithium salt by rinsing with the solvent or decomposition.

Preferred examples of the lithium salt (II) include $LiBF_4$, LiF, LiCl, LiBr, LiI, $LiPF_6$, LiOH, $LiCO_2H$, $LiCO_2CH_3$, $LiCO_2CF_3$, $LiSO_2CH_3$, $LiSO_2CF_3$, LiCN, $LiN(CN)_2$, $LiC(CN)_3$, LiSCN, $LiN(SO_2CF_3)_2$ and $LiN(SO_2F)_2$, among which $LiBF_4$, $LiPF_6$, $LiCO_2H$, $LiCO_2CH_3$, $LiCO_2CF_3$, $LiSO_2CH_3$, $LiSO_2CF_3$ and $LiN(SO_2CF_3)_2$ are preferred for solubility in the ionic liquid (I), and $LiBF_4$, $LiPF_6$, $LiCO_2H$, $LiCO_2CH_3$, $LiCO_2CF_3$, $LiSO_2CH_3$ and $LiSO_2CF_3$ are preferred for solubility of the counter anion in water. A reaction solvent is not particularly required but, where the reaction solvent is used, methylene chloride, chloroform and toluene are preferred for the efficiency of the cation exchange, and methylene chloride is preferred for the efficiency of the rinsing with the solvent.

In a specific reaction method, for example, a composition including a lithium cation, an organic cation, a counter anion and a cyanofluorophosphate anion is provided by mixing 10 to 90 mol % of the ionic liquid (I) and 90 to 10 mol % of the lithium salt (II) with stirring at 10° C. to 60° C. for 1 minute to 24 hours. The range of the blending ratio between the ionic liquid (I) and the lithium salt (II) is preferably 20 to 80 mol %: 80 to 20 mol %, more preferably 30 to 70 mol %: 70 to 30 mol %. If the amount of the lithium salt is smaller, the lithium cation in the electrolyte tends to be insufficient, making it impossible to ensure the performance of the lithium secondary battery. If the amount of the lithium salt is greater, the electrolyte tends to have a higher viscosity and a lower electrical conductivity. The reaction temperature is preferably in a range of 20° C. to 50° C., more preferably 25° C. to 40° C. If the reaction temperature is excessively low, longer reaction time tends to be required. If the reaction temperature is excessively high, the counter anion is liable to decompose. The reaction period is preferably in a range of 30 minutes to 12 hours, more preferably in a range of 1 to 6 hours. If the reaction period is excessively short, the lithium salt (II) tends to be insufficiently dissolved in the ionic liquid (I), resulting in insufficient cation exchange. An excessively long reaction period tends to result in lower productivity.

In a specific solvent rinsing method, 10 to 1000 parts by weight of a rinsing solvent such as an alcohol, an ether or a solvent mixture of water and an alcohol or an ether is added to 100 parts by weight of the aforementioned composition, and the resulting mixture is stirred at 0° C. to 60° C. for 1 to 5 hours. Then, a water layer in which the counter anion is dissolved is removed, followed by filtration and drying. Thus, the intended electrolyte material containing the lithium cation (A1), the organic cation (A2) and the cyanofluorophosphate anion (B) is provided. The amount of the rinsing solvent is preferably 20 to 700 parts by weight, more preferably 30 to 500 parts by weight, based on 100 parts by weight of the composition. If the amount of the rinsing solvent is excessively small, the counter anion removal ratio tends to be reduced. If the amount of the rinsing solvent is excessively great, the productivity tends to be reduced. The solvent rinsing operation may be repeated twice or more.

The amount of the lithium cation in the electrolyte, i.e., $a_1/(a_1+a_2)$, can be controlled by the formulation of the ionic liquid, the type and the amount of the lithium salt and the type and the amount of the rinsing solvent.

In a specific method of removing the counter anion by the decomposition, 60 to 99 mol % of the ionic liquid (I) and 1 to 40 mol % of a lithium carboxylate (II) such as lithium formate are typically mixed together with stirring at 10° C. to 60° C. for 1 minute to 24 hours, and then a proton source such as water is added to the resulting mixture, which is in turn heated to 100° C. to 500° C., more preferably 200° C. to 300° C. Thus, the anion is removed. If the temperature is excessively low, the reaction is unlikely to proceed. If the temperature is excessively high, the organic cation is liable to decompose. The reaction period is preferably in a range of 30 minutes to 12 hours, more preferably 1 to 6 hours. If the period is excessively short, the decomposition of the anion is insufficient. If the period is excessively long, the organic cation is liable to decompose.

The inventive electrolyte material may be provided by mixing the lithium salt including the lithium cation (A1) and the cyanofluorophosphate anion (B) with the ionic liquid (I) including the organic cation (A2) and the cyanofluorophosphate anion (B), or by partly exchanging the lithium cation (A1) of the lithium salt (II) with the organic cation (A2).

In the cation exchange of the ionic liquid (I) including the organic cation (A2) and the cyanofluorophosphate anion (B), all the organic cation (A2) in the ionic liquid may be exchanged with the lithium cation (A1) to provide the lithium salt including the lithium cation (A1) and the cyanofluorophosphate anion (B).

Thus, the inventive electrolyte materials are provided. These electrolyte materials may be used either alone or in combination. For example, electrolyte materials having different organic cations and having different integers n in the general formula (1) may be used in combination.

As required, a lithium salt and/or an electrode protection film forming agent falling outside the scope of the present invention may be blended with the electrolyte produced by using either of the inventive electrolyte materials.

Examples of the lithium salt include $LiBF_4$, $LiBR_4$ (wherein R is a phenyl group or an alkyl group), $LiBF_mR_{4-m}$ (wherein R is an alkyl group which may contain a fluorine atom, and m is an integer of 1 to 3), $LiPF_6$, $LiSbF_6$, $LiAsF_6$, $LiClO_4$, $LiSO_3CF_3$, $LiN(SO_2CF_3)_2$, $LiN(SO_2F)_2$, $LiN(SO_2CF_3)(SO_2F)$, $LiN(CN)_2$, $LiC(SO_2CF_3)_3$, $LiSO_3C_6F_{13}$, $LiSO_3C_8F_{17}$, $LiAlCl_4$ and lithium tetrakis[3,5-bis(trifluoromethyl)phenyl]borate, among which lithium salts such as $LiBF_4$, $LiPF_6$, $LiN(SO_2CF_3)_2$ and $LiN(SO_2F)_2$ are preferably used.

The proportion of the lithium salt is preferably 0.1 to 10 parts by weight, more preferably 0.2 to 5 parts by weight, particularly preferably 0.3 to 3 parts by weight, based on 100 parts by weight of the electrolyte. If the proportion of the lithium salt is excessively great, the electrolyte tends to have an insufficient anti-oxidation potential.

Examples of the electrode protection film forming agent falling outside the scope of the present invention include vinylene carbonate, 1,3-propanesultone, ethylene sulfite, triethylene borate and butyl methyl sulfonate, among which vinylene carbonate is particularly preferred because it is capable of forming a stable SEI on a negative electrode.

The proportion of the electrode protection film forming agent is preferably 0.1 to 5 parts by weight, more preferably 0.2 to 3 parts by weight, particularly preferably 0.3 to 1 part by weight, based on 100 parts by weight of the entire electrolyte. If the proportion is excessively high, the electrical conductivity of the electrolyte tends to be reduced. If the proportion is excessively low, it will be impossible to provide the effect of stabilizing the potential window of the lithium secondary battery.

Next, a lithium secondary battery produced by using the inventive electrolyte will be described.

In the present invention, the lithium secondary battery is produced by sandwiching the inventive electrolyte produced in the aforementioned manner between a positive electrode and a negative electrode.

The positive electrode is preferably a composite positive electrode. The composite positive electrode is produced by applying a composition prepared by mixing an electrically conductive additive such as ketjen black or acetylene black, a binder such as polyvinylidene fluoride and, as required, an ion conductive polymer with a positive electrode active substance onto an electrically conductive metal plate such as an aluminum foil.

Examples of the positive electrode active substance include an inorganic active substance, an organic active substance, and a composite of these active substances. For higher energy density of the battery, the inorganic active substance or the composite of the inorganic active substance and the organic active substance are preferred.

Examples of the inorganic active substance include metal oxides such as $Li_{0.3}MnO_2$, $Li_4Mn_5O_{12}$, $V_2O_5$, $LiFePO_4$ and $LiMnO_3$ for 3V systems, $LiCoO_2$, $LiMn_2O_4$, $LiNiO_2$, $LiNi_{1/3}Mn_{1/3}Co_{1/3}O_2$, $LiNi_{1/2}Mn_{1/2}O_2$, $LiNi_{0.8}Co_{0.2}O_2$, $LiMnPO_4$ and $Li_2MnO_3$ for 4V systems, and $Li_2MnO_3$ and $LiNi_{0.5}Mn_{1.5}O_2$ for 5V systems, metal sulfides such as $TiS_2$, $MoS_2$ and FeS, and composite oxides of lithium and any of these compounds. Usable examples of the organic active substance include electrically conductive polymers such as polyacetylenes, polyanilines, polypyrroles, polythiophenes and polyparaphenylenes, organic disulfide compounds, carbon disulfide and active sulfur.

Examples of the negative electrode include a metal negative electrode including a collector to which a negative electrode active substance is directly applied, and a negative electrode including a collector of an alloy on which an active substance such as an electrically conductive polymer, a carbon material or an oxide bound by a binder such as a polyvinylidene fluoride is applied.

Examples of the negative electrode active substance include metal lithium, metal silicon, alloys of lithium and metals such as aluminum, lead, tin, silicon and magnesium, metal oxides such as $SnO_2$ and $TiO_2$, cation-dopable electrically-conductive polymers such as polypyridines, polyacetylenes, polythiophenes and derivatives of any of these polymers, and lithium-occluding carbon materials. Where the inventive electrolyte is used, metal lithium and metal silicon having a higher energy density are particularly preferred.

Where metal lithium is used in the present invention, the metal lithium is preferably formed to a thickness of 1 to 100 µm, more preferably 3 to 50 µm, particularly preferably 5 to 20 µm. It is economically preferred to use metal lithium in the form of a thin lithium foil.

The inventive lithium secondary battery is produced by sandwiching the electrolyte between the positive electrode and the negative electrode described above and, for prevention of short circuit, a separator is preferably used. More specifically, the separator is impregnated with the electrolyte, and sandwiched between the positive electrode and the negative electrode, whereby the lithium secondary battery is provided.

Examples of the separator include micro-porous films, organic and inorganic nonwoven fabrics, and organic and inorganic woven fabrics each made of at least one material selected from polypropylenes, polyethylenes, polyesters, polytetrafluoroethylenes, polyvinyl alcohols and saponification products of ethylene-vinyl acetate copolymers, among which micro-porous films made of polypropylenes and polyethylenes and glass nonwoven fabrics are preferred for prevention of short circuit and for economy.

The shape of the inventive lithium secondary battery is not particularly limited, but the inventive lithium secondary battery may have any of various battery cell forms such as a coin form, a sheet form and a cylindrical form.

EXAMPLES

The present invention will hereinafter be described more specifically by way of examples. However, the present invention is not limited to the following Examples without departing from the scope of the invention.

Incidentally, "part(s)" in Examples are based on weight.
Conditions for measurement of properties are as follows:
(Electrical Conductivity)

A CG-511B cell manufactured by DKK-TOA Corporation was used as a measurement cell. After the cell was immersed in an ionic liquid for 5 hours, the electrical conductivity was measured at an ordinary temperature (25° C.) and at a cryogenic temperature (−20° C.) by an AC impedance method by means of an electrochemical measurement system "SOLARTRON 1280Z" (manufactured by British Solartron Inc.) The measurement was carried out at an AC amplitude of 5 mV in a frequency range of 20 k to 0.1 Hz.
(Anti-Oxidation Potential)

A V-4C voltammetry cell manufactured by BAS Inc. was used as a measurement cell. Electrodes produced by BAS Inc. were used. A glassy carbon electrode (having a diameter of 1 mm) was used as a working electrode, and a platinum electrode was used as a counter electrode. Further, a lithium electrode was used as a reference electrode. Measurement was carried out at a potential sweeping rate of 5 mV/sec at a temperature of 25° C. An electrochemical measurement system "SOLARTRON 1280Z" (manufactured by British Solartron Inc.) was used as a measurement apparatus. The current density limits were set to ±1 $mA/cm^2$, and a potential observed when +1 $mA/cm^2$ was reached was defined as an anti-oxidation potential (V).
(Analyzer)

"JMS-T100LP AccuTOF LC-plus" manufactured by JEOL Ltd. was used for mass spectrometry (MS), and "AVATAR 360" manufactured by Nicolet Corporation was used for IR spectrometry. "UNITY-300" manufactured by Varian Inc. was used for NMR (using deuterated acetonitrile as a solvent).

Example 1

Production of Electrolyte Material (1) (Lithium Salt)

In an argon stream, 40.17 g (0.30 mol) of silver cyanide and 150 mL of dehydrated xylene were added into a 500-mL four-neck flask, and 8.74 mL (0.10 mol) of phosphorus trichloride was added dropwise to the resulting mixture by a dropping funnel in an ice bath. After the resulting mixture was stirred at 100° C. for 5 hours, the reaction solution was filtered to yield a sediment. Then, 150 mL of dehydrated diethyl ether was added to the resulting sediment, and the resulting mixture was filtered. The resulting filtrate was concentrated, whereby 10 g of tricyanophosphine (white solid) was yielded. The results of analysis of the yielded tricyanophosphine were as follows:

| | |
|---|---|
| $^{31}$P-NMR | −132.5 ppm |
| IR | 2190 cm$^{-1}$ [CN] |

Subsequently, 1.87 g (0.028 mol) of lithium chloride was added to 20 mL of dehydrated dichloromethane in a 100-mL three-neck flask in an argon stream and, after the resulting mixture was cooled to −78° C., 1.2 equivalents (0.034 mol) of chlorine gas was injected into the mixture. Further, 3.05 g (0.028 mol) of tricyanophosphine dissolved in 20 mL of acetonitrile was added dropwise to the mixture. Thereafter, the temperature of the resulting mixture was gradually elevated to a room temperature, and the mixture was stirred for 2 hours. Then, the reaction solution was filtered, and the resulting filtrate was concentrated, whereby an ocher solid was yielded. Further, dehydrated acetonitrile was added to the resulting solid. Then, the resulting mixture was filtered, and the resulting filtrate was concentrated, whereby 6.081 g of a pale yellow solid was yielded. The following was the results of the analysis of the solid thus yielded, and the solid was identified as lithium trichlorotricyanophosphate.

| | |
|---|---|
| MS | m/z = 213.92696 |
| IR | 2200 cm$^{-1}$ [CN] |
| $^{31}$P-NMR | −333.579 ppm [s, P] |

In turn, 36.9 g (0.190 mol) of silver tetrafluoroborate (AgBF$_4$) was added together with 100 mL of dehydrated dichloromethane into a 300-mL three-neck flask in an argon stream, and dissolved in 10 mL of dehydrated acetonitrile further added thereto in an ice bath. Then, 6.0 g (0.0027 mol) of lithium trichlorotricyanophosphate dissolved in 25 mL of dehydrated acetonitrile was added dropwise to the resulting solution. After the solution was stirred at a room temperature for 2 hours, the reaction solution was filtered, and the resulting filtrate was concentrated. Further, the resulting product was rinsed with 400 mL of ultra-pure water and, after filtration, the resulting sediment was dried in vacuum, whereby 3.77 g of an ocher solid was yielded. The following is the results of the analysis of the solid thus yielded, and the solid was identified as silver trifluorotricyanophosphate.

| | |
|---|---|
| MS (+) | m/z = 188.92361 |
| MS (−) | m/z = 166.00182 |
| IR | 2200 cm$^{-1}$ [CN] |
| $^{31}$P-NMR | −218.964 ppm [q, Hz = 740.8 Hz, P] |
| $^{19}$F-NMR | −36.6605 ppm [d, Hz = 740.8 Hz, F] |

Figure 1:
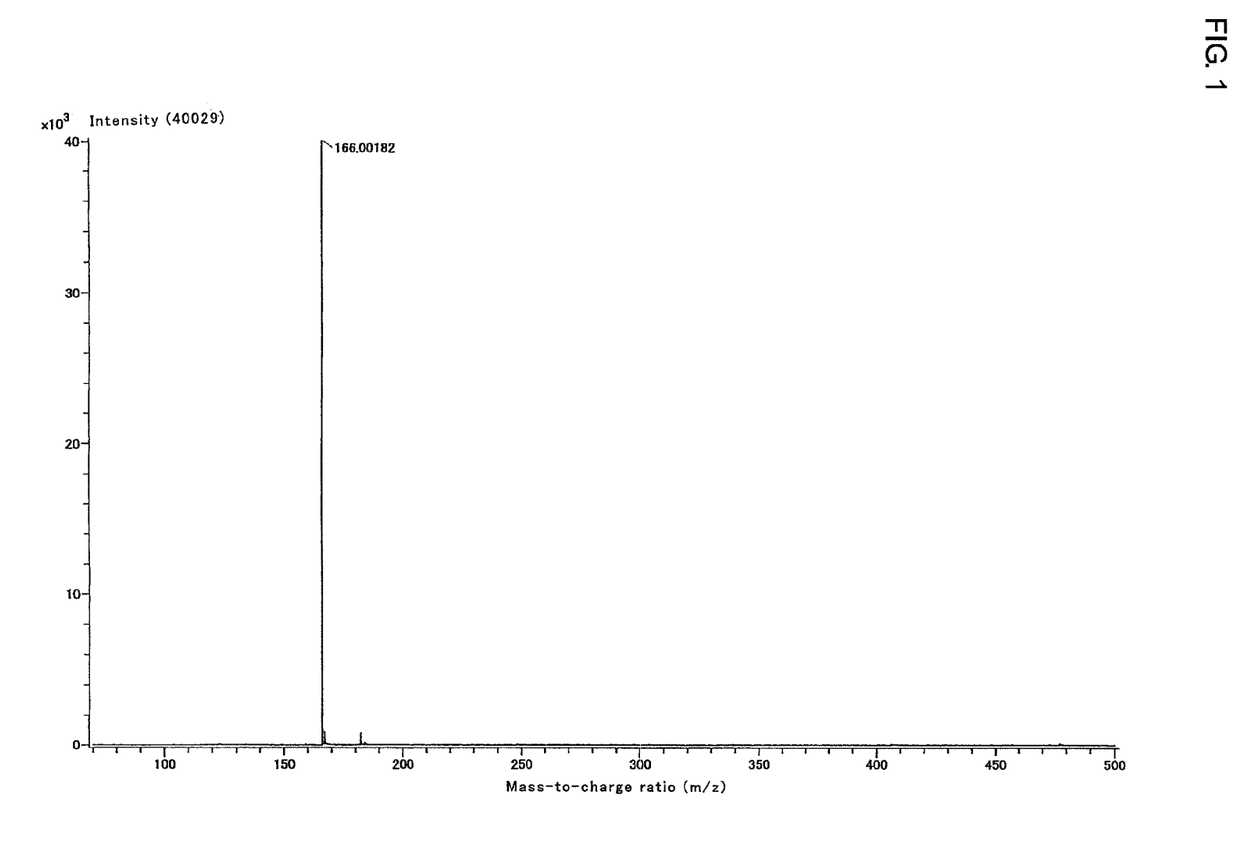
FIG. 1 is an MS(−) chart of a lithium salt of Example 1.
Figure 2:
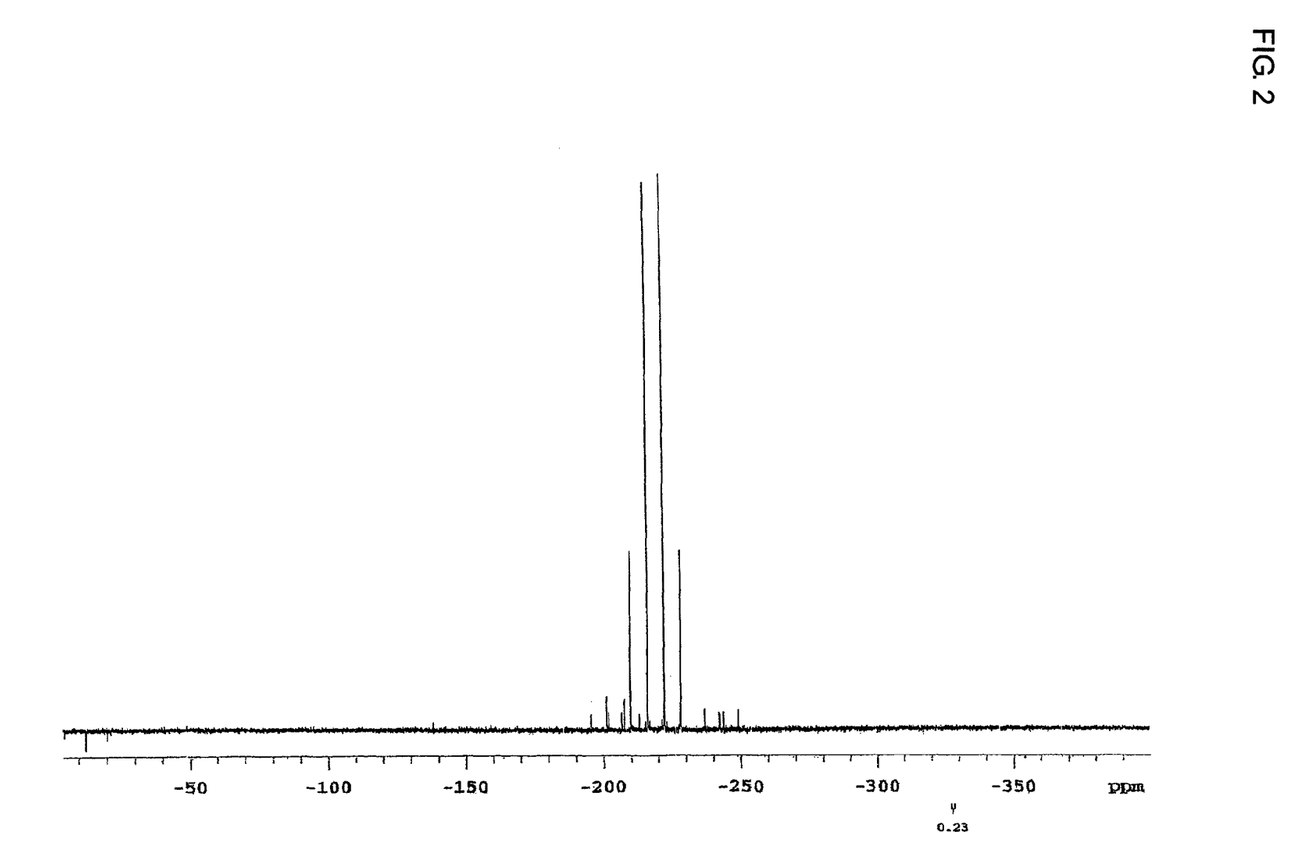
FIG. 2 is a $^{31}$P-NMR chart of the lithium salt of Example 1.
Figure 3:
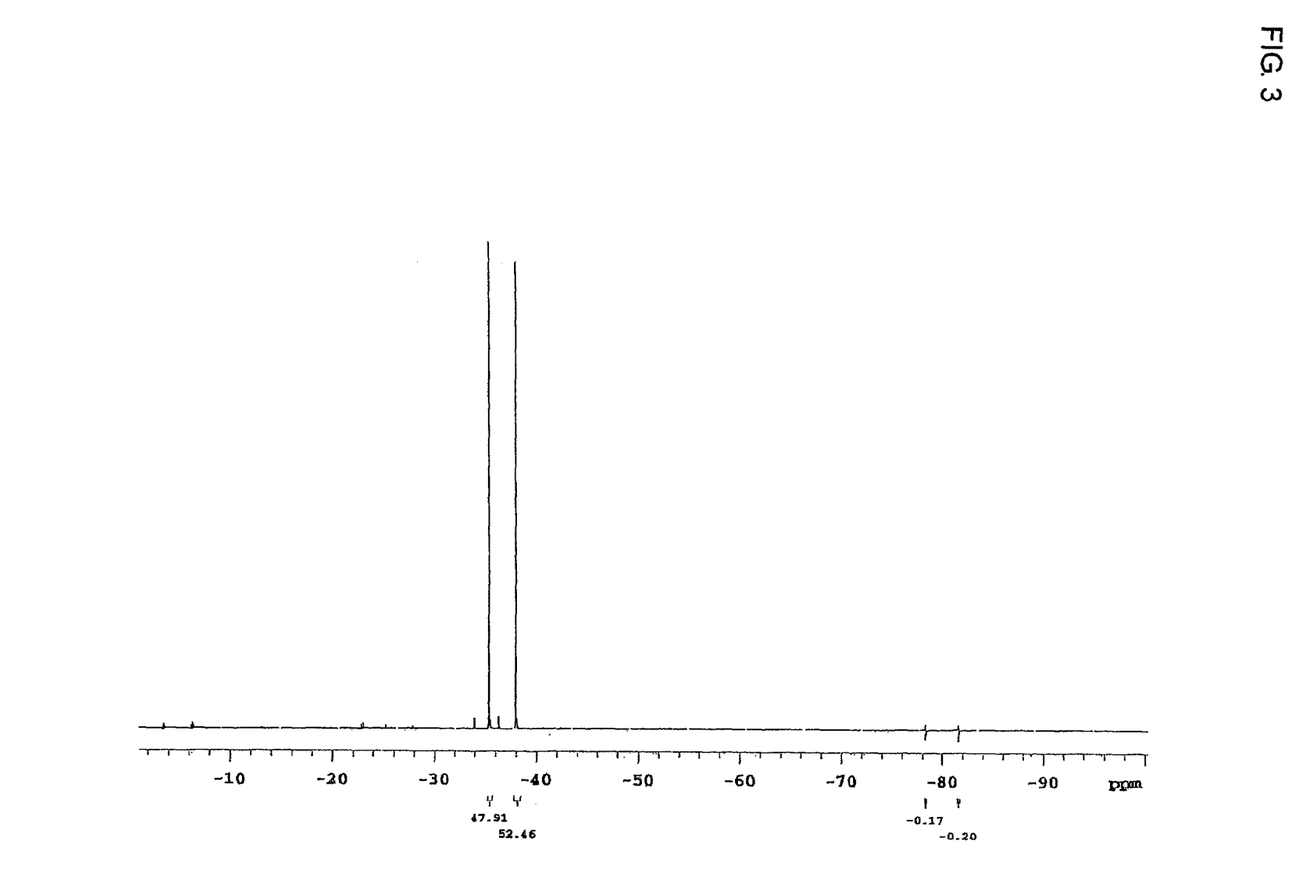
FIG. 3 is a $^{19}$F-NMR chart of the lithium salt of Example 1.
Figure 4:
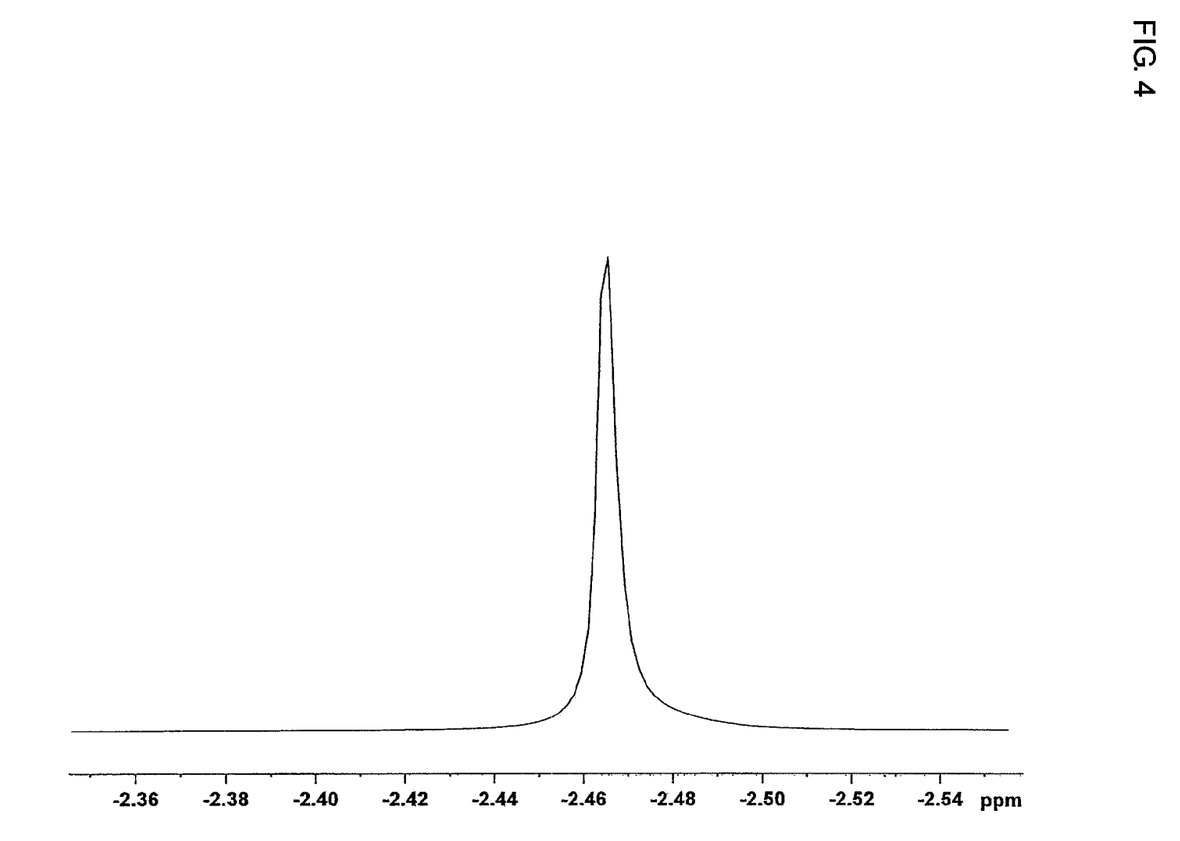
FIG. 4 is a $^7$Li-NMR chart of the lithium salt of Example 1.

Subsequently, 11.6 g (0.04 mol) of silver trifluorotricyanophosphate was added to 70 mL of dimethyl carbonate in a 300-mL three-neck flask, and 5.60 g (0.04 mol) of lithium iodide dissolved in 100 mL of dimethyl carbonate was added dropwise to the resulting mixture. After the resulting mixture was stirred for 30 minutes, the reaction solution was analyzed by mass spectrometry (MS). As a result, an Ag cation peak was not detected. It was judged that the Ag cation was precipitated in the form of AgI from the reaction solution by cation exchange, and the reaction was stopped. The resulting reaction solution was filtered, and the resulting filtrate was concentrated. Further, the filtrate was dissolved in 100 mL of dehydrated acetonitrile. Then, the resulting solution was filtered, and the resulting filtrate was concentrated. The resulting concentrate was dried at 100° C. in vacuum for 2 days, whereby a grayish white solid was yielded. The following is the results of the analysis of the solid thus yielded, and the solid was identified as lithium trifluorotricyanophosphate (lithium salt). Of the following analysis results, an MS (−) chart of the lithium salt is shown in FIG. 1, and a $^{31}$P-NMR chart is shown in FIG. 2. A $^{19}$F-NMR chart is shown in FIG. 3, and a $^{7}$Li-NMR chart is shown in FIG. 4.

| | |
|---|---|
| MS (+) | m/z = 130.08301 |
| MS (−) | m/z = 166.00182 |
| IR | 2200 cm$^{-1}$ [CN] |
| $^{31}$P-NMR | −218.991 ppm [q, Hz = 740.1 Hz, P] |
| $^{19}$F-NMR | −36.7635 ppm [d, Hz = 741.6 Hz, F] |
| $^{7}$Li-NMR | −2.47 ppm |

Production of Electrolyte (1)

An electrolyte (1) was produced by dissolving 8.6 g (0.05 mol) of the yielded electrolyte material (1) in 100 g of an electrolytic liquid including ethylene carbonate (50 vol %) and dimethyl carbonate (50 vol %).

The properties of the electrolyte thus produced are shown in Table 1. It was confirmed that the electrolyte was excellent in electrochemical properties with a higher electrical conductivity at a cryogenic temperature and a higher anti-oxidation potential.

The electrolyte (1) thus produced can be used, for example, for producing a lithium secondary battery in the following manner. The electrolyte (1) is useful as an electrolyte for the lithium secondary battery.

Production of Lithium Secondary Battery (1) Production of Positive Electrode First, 9.0 g of LiCoO$_2$ powder, 0.5 g of ketjen black and 0.5 g of polyvinylidene fluoride were mixed together, and then 7.0 g of 1-methyl-2-pyrrolidone was added to and mixed with the resulting mixture in a mortar, whereby a positive electrode slurry was prepared. The positive electrode slurry thus prepared was applied onto a 20-μm thick aluminum foil by means of a wire bar in the atmosphere. In turn, the positive electrode slurry was dried at 100° C. for 15 minutes, and further dried at 130° C. at a reduced pressure for 1 hour. Thus, a composite positive electrode having a film thickness of 30 μm was produced.

(2) Assembly of Battery

A separator (CELGARD #2400 manufactured by Celgard Inc. and having a thickness of 20 μm) and the composite positive electrode were impregnated with the above electrolyte (1). Then, the separator and a lithium foil negative electrode (having a thickness of 500 μm) were stacked in this order on the composite positive electrode, and the resulting assembly was inserted and sealed in a Type 2032 coin cell. Thus, a lithium secondary battery was produced.

Example 2

Production of Electrolyte Material (2)

First, 83.2 g (0.3 mol) of 1-ethyl-3-methylimidazolium trifluorotricyanophosphate as the ionic liquid (I) was added to 51.9 g (0.3 mol) of the lithium salt (lithium trifluorotricyanophosphate) produced in Example 1, and then the resulting mixture was stirred at a room temperature for 1 hour. Thus, a liquid electrolyte material (2) including 25 mol % of a lithium cation, 25 mol % of a 1-ethyl-3-methylimidazolium cation and 50 mol % of a trifluorotricyanophosphate anion was produced.

Production of Electrolyte (2)

An electrolyte (2) was produced by mixing 70 g of the produced electrolyte material (2) (including 26.9 g (0.16 mol) of lithium trifluorotricyanophosphate) with 30 g of an electrolytic liquid including ethylene carbonate (50 vol %) and dimethyl carbonate (50 vol %).

The properties of the electrolyte thus produced are shown in Table 1. It was confirmed that the electrolyte was excellent in electrochemical properties with a higher electrical conductivity at a cryogenic temperature and a higher anti-oxidation potential.

The electrolyte (2) thus produced can be used for producing a lithium secondary battery in substantially the same manner as in the lithium secondary battery production method described in Example 1, and is useful as an electrolyte for the lithium secondary battery.

Example 3

An electrolyte (3) was produced by dissolving 17.3 g (0.1 mol) of the produced electrolyte material (1) in 100 g of an electrolytic liquid including ethylene carbonate (50 vol %) and dimethyl carbonate (50 vol %). The electrolyte thus produced was evaluated in the same manner as in Example 1.

Comparative Example 1

An electrolyte was prepared by dissolving 7.6 g (0.05 mol) of $LiPF_6$ in 100 g of a mixture of ethylene carbonate (50 vol %) and dimethyl carbonate (50 vol %). The electrolyte was evaluated in the same manner as in Example 1.

The results are shown in Table 1.

TABLE 1

|  | $a_1/(a_1 + a_2)$ | Li salt concentration (mol/kg) | Electrical conductivity (mS/cm) at 25° C. | Electrical conductivity (mS/cm) at −20° C. | Anti-oxidation potential (V) (vs Li/Li⁺) |
|---|---|---|---|---|---|
| Example 1 | 1 | 0.5 | 10 | 3 | 7.4 |
| Example 2 | 0.5 | 1.6 | 15 | 3 | 7.3 |
| Example 3 | 1 | 1.0 | 10 | 3 | 7.4 |
| Comparative Example 1 | 1 | 0.5 | 10 | Frozen | 6.5 |

As apparent from the evaluation results for Examples and Comparative Example described above, the electrolytes of Examples are more excellent in electrical conductivity at the ordinary temperature and at the cryogenic temperature and in anti-oxidation potential than the electrolyte of Comparative Example and, therefore, are very useful as electrolytes for lithium secondary batteries.

While specific forms of the embodiments of the present invention have been described, it should be understood that the embodiments described above are merely illustrative of the present invention but not limitative of the invention. Alterations made within the equivalent scope of the claims are deemed to fall within the scope of the present invention.

The inventive electrolyte materials are excellent in electrolyte properties, i.e., have a higher electrical conductivity and a higher anti-oxidation potential. Further, the inventive electrolyte materials are excellent in safety and, therefore, very useful for lithium secondary battery electrolytes. The inventive electrolyte materials are also useful as electrolytes for other secondary batteries, primary batteries, capacitors, condensers, actuators, electrochromic elements, various sensors, dye-sensitized solar cells and fuel cells, and further useful for antistatic agents, polymerization initiators, ion exchange film materials and ion glass materials.

The invention claimed is:

1. A material for use as an electrolyte comprising a lithium salt which comprises the following components (A1) and (B):
   (A1) a lithium cation; and
   (B) a cyanofluorophosphate anion represented by the following general formula (1):

$$^-P(CN)_nF_{6-n} \qquad (1)$$

wherein n is an integer of 1 to 5.

2. A material for use as an electrolyte comprising the following components (A1), (A2) and (B):
   (A1) a lithium cation;
   (A2) an organic cation; and
   (B) a cyanofluorophosphate anion represented by the following general formula (1):

$$^-P(CN)_nF_{6-n} \qquad (1)$$

wherein n is an integer of 1 to 5.

3. The material for use as an electrolyte according to claim 1, wherein n in the general formula (1) is 3.

4. The material for use as an electrolyte according to claim 2, wherein the mole number $a_1$ of the lithium cation (A1) and the mole number $a_2$ of the organic cation (A2) satisfy the following expression (1-1):

$$0.1 \leq a_1/(a_1+a_2) \leq 0.9 \qquad (1\text{-}1).$$

5. The material for use as an electrolyte according to claim 2, wherein the organic cation is a nitrogen-containing organic cation.

6. The material for use as an electrolyte according to claim 5, wherein the nitrogen-containing organic cation is an imidazolium cation.

7. The material for use as an electrolyte according to claim 1, which is used as an electrode protection film forming agent.

8. A lithium secondary battery electrolyte, which comprises a material for use as an electrolyte as recited in claim 1.

9. The lithium secondary battery electrolyte according to claim 8, which has an anti-oxidation potential of not less than 7 V (vs Li/Li$^+$).

10. A lithium secondary battery comprising a lithium secondary battery electrolyte as recited in claim 8, and a positive electrode and a negative electrode between which the lithium secondary battery electrolyte is held.

11. A lithium salt comprising the following components (A1) and (B):
(A1) a lithium cation; and
(B) a cyanofluorophosphate anion represented by the following general formula (1):

$$^-P(CN)_nF_{6-n} \qquad (1)$$

wherein n is an integer of 1 to 5.

12. The material for use as an electrolyte according to claim 2, wherein n in the general formula (1) is 3.

13. The material for use as an electrolyte according to claim 2, which is used as an electrode protection film forming agent.

14. A lithium secondary battery electrolyte, which comprises a material for use as an electrolyte as recited in claim 2.

15. The lithium secondary battery electrolyte according to claim 14, which has an anti-oxidation potential of not less than 7 V (vs Li/Li$^+$).

16. A lithium secondary battery comprising a lithium secondary battery electrolyte as recited in claim 14, and a positive electrode and a negative electrode between which the lithium secondary battery electrolyte is held.

17. A lithium secondary battery comprising a lithium secondary battery electrolyte as recited in claim 9, and a positive electrode and a negative electrode between which the lithium secondary battery electrolyte is held.

18. A lithium secondary battery comprising a lithium secondary battery electrolyte as recited in claim 15, and a positive electrode and a negative electrode between which the lithium secondary battery electrolyte is held.

\* \* \* \* \*